US009803753B2

(12) United States Patent
Negra et al.

(10) Patent No.: US 9,803,753 B2
(45) Date of Patent: Oct. 31, 2017

(54) SEALING DEVICE, IN PARTICULAR FOR A SHAFT INSERTED TRANSVERSELY IN A VESSEL OF FLUIDS UNDER PRESSURE OR GRANULAR MATERIAL IN MOVEMENT

(71) Applicants: DANIELI & C. OFFICINE MECCANICHE SPA, Buttrio (IT); HYL TECHNOLOGIES, S.A. DE C.V., San Nicolas de los Garza, N.L. (MX)

(72) Inventors: Angelico Della Negra, Povoletto (IT); Massimiliano Zampa, Udine (IT); Riccardo Antonini, Trieste (IT)

(73) Assignees: DANIELI & C. OFFICINE MECCANICHE SPA, Buttrio (IT); HYL TECHNOLOGIES, S.A. DE C.V., San Nicolas de los Garza, N.L. (MX)

( * ) Notice: Subject to any disclaimer, the term of this patent is extended or adjusted under 35 U.S.C. 154(b) by 0 days.

(21) Appl. No.: 14/415,942

(22) PCT Filed: Jul. 19, 2013

(86) PCT No.: PCT/EP2013/065272
§ 371 (c)(1),
(2) Date: Jan. 20, 2015

(87) PCT Pub. No.: WO2014/013048
PCT Pub. Date: Jan. 23, 2014

(65) Prior Publication Data
US 2015/0204446 A1    Jul. 23, 2015

(30) Foreign Application Priority Data

Jul. 20, 2012 (IT) .............................. UD2012A0131

(51) Int. Cl.
*F16J 15/34* (2006.01)
*F16J 15/18* (2006.01)
(Continued)

(52) U.S. Cl.
CPC ............... *F16J 15/348* (2013.01); *B63B 9/00* (2013.01); *F16J 15/187* (2013.01); *F27D 99/0073* (2013.01); *F27D 2099/0078* (2013.01)

(58) Field of Classification Search
CPC .......... F16J 15/18; F16J 15/183; F16J 15/185; F16J 15/186; F16J 15/188; F16J 15/189;
(Continued)

(56) References Cited

U.S. PATENT DOCUMENTS 2,624,599 A    8/1950 Eaton
2,978,914 A *  4/1961 Gut ........................ F16H 21/48
                                                74/18.1
(Continued)

FOREIGN PATENT DOCUMENTS

EP    0052423    5/1982
EP    0970743    1/2000
EP    1186811    3/2002

*Primary Examiner* — Kristina Fulton
*Assistant Examiner* — L. Susmitha Koneru
(74) *Attorney, Agent, or Firm* — Hamre, Schumann, Mueller & Larson, P.C.

(57) ABSTRACT

A sealing device for a vessel to achieve a fluid-tight seal in an aperture made in the lateral wall of said vessel, into which aperture a shaft is inserted. The sealing device comprises first sealing means disposed in contact with the shaft in the zone of said aperture, and second sealing means, comprising a containing body and a flexible connection element. The first sealing means comprise a plurality of sealing rings, disposed coaxial to the shaft and in contact with the latter, and a containing tube to contain the sealing rings. The lateral wall of the vessel comprises an interface flange. A closing flange is connected to the interface flange and to a flanged (Continued)

end of the containing body by means of attachment means and is positioned in contact with the containing tube and with the flexible connection element to keep the first sealing means in a determinate axial position with respect to the shaft.

10 Claims, 4 Drawing Sheets

(51) Int. Cl.
*B63B 9/00* (2006.01)
*F27D 99/00* (2010.01)

(58) Field of Classification Search
CPC ........ F16J 15/181; F16J 15/182; F16J 15/184; F16J 15/187; F16J 15/348; F16C 17/10
See application file for complete search history.

(56) References Cited

U.S. PATENT DOCUMENTS

| | | | |
|---|---|---|---|
| 3,054,619 A * | 9/1962 | Pierotti | F16J 15/182 |
| | | | 277/514 |
| 4,330,135 A * | 5/1982 | Butterfield | F16J 15/54 |
| | | | 277/504 |
| 4,569,669 A * | 2/1986 | Starling | F16J 15/525 |
| | | | 464/175 |
| 5,188,377 A * | 2/1993 | Drumm | F16J 15/3488 |
| | | | 277/353 |
| 5,344,164 A * | 9/1994 | Carmody | F16J 15/3472 |
| | | | 277/371 |
| 2002/0047241 A1 * | 4/2002 | Franz | F16J 15/187 |
| | | | 277/510 |

* cited by examiner

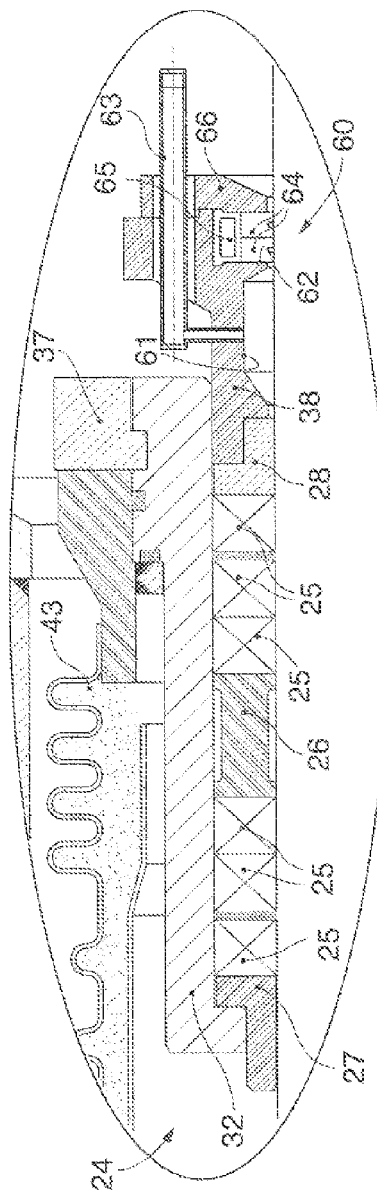
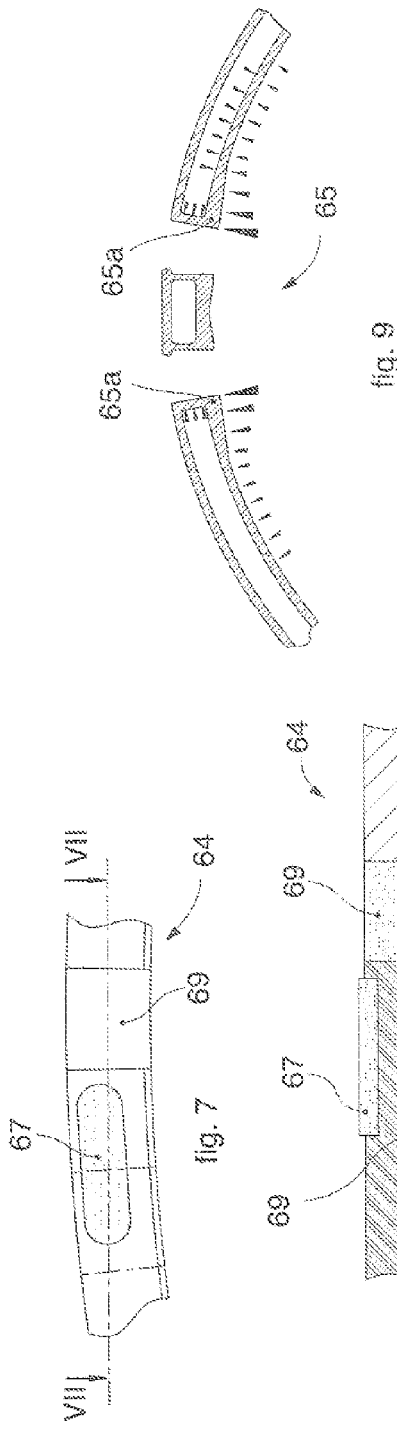
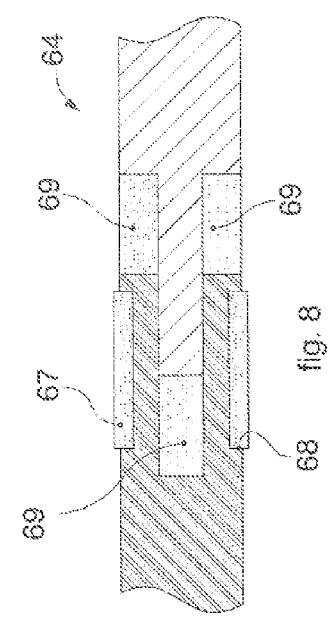

SEALING DEVICE, IN PARTICULAR FOR A SHAFT INSERTED TRANSVERSELY IN A VESSEL OF FLUIDS UNDER PRESSURE OR GRANULAR MATERIAL IN MOVEMENT

FIELD OF THE INVENTION

The present invention concerns a sealing device for shafts or bars, suitable to be applied in a vessel suitable to contain fluids under pressure and/or granular material in movement. In particular, the device according to the present invention is suitable to be coupled with shafts or bars, either rotating or non-rotating, subjected to compound stresses of the flexional, linear or torsional type. Some applications of the sealing device according to the present invention are large size shafts, up to more than a meter in diameter, so that no dirt enters into the corresponding vessel, and to keep a possible pressurized fluid inside the vessel, or shafts for marine engines, to prevent water entering into the hull, thus reducing the need to carry out maintenance, or shafts for direct reduction reactors, to allow the granular material to move inside the reactor, preventing the leakage of gas.

BACKGROUND OF THE INVENTION

It is known to use, for example in some vessels of pressurized fluid and/or granular material in movement, shafts or bars on one or more levels, which pass through the whole vessel transversely and, with movements of partial or complete rotation, induce new conditions of physical equilibrium, for example to prevent possible discontinuity in the stream of granular material being processed by the vessels. Furthermore, the shafts allow to prevent the formation of agglomerates or bridges caused by the pressure, in the range of many tons, which the column of material above exerts on the lower part.

The support devices for the shafts, which can have a range of diameters comprised between about 400 mm and more than 1000 mm, are normally positioned in correspondence with the ends of the shafts, and are disposed outside the vessel.

In correspondence with the apertures made in the lateral wall of the vessels, and in order to allow the shafts to be inserted, it is also known to use sealing devices which isolate the inside of the vessel from the outside, and allow the shafts to rotate, at the same time preventing leakages of fluid, which can also be at high temperatures, for example comprised between about 800° C. and about 1000° C.

Sealing devices are known, made of a plurality of annular elements, normally 5 or 6, with a square cross section and consisting of synthetic fibers, wound with each other in a plait and compressed by a rigid element, such as for example a connection flange, in a toroid seating situated between the shaft and an interface flange, solid with the vessel, or connected with a flexible element acting on a vertical plane.

One disadvantage of these known devices is that they are not able to keep themselves coaxial with the shaft when the latter is in a non-centered position with respect to the vessel as a consequence of the dilatation of the lateral wall of the vessel caused by high inner temperatures. The displacement of the lateral wall causes an asymmetrical deformation of known sealing devices, which are excessively compressed in the lower part of the shaft, whereas in the upper part spaces can be created from which gas could leak from the vessel, in practice reducing the effectiveness of the sealing devices.

In the light of these problems, the only possibility is to compress the seal and the consequent reduction in the duration thereof.

From EP-A1-1186811, EP-A1-0052423, U.S. Pat. No. 2,624,599 and EP-A1-0970743 sealing devices are known which are configured to seal an aperture in which a rotating shaft is inserted. These known sealing devices are able to compensate for axial displacements of the shaft or for one-direction radial movements, such as vertical displacements. All the above mentioned sealing devices are yet not configured to keep the aperture sealed in case of multi-direction shaft displacement, for example defined by an axial and two radial displacements, vertical and horizontal, or lateral, ones.

Purpose of the present invention is to obtain a sealing device which, in any operating condition, irrespective of the amount of the flexion to which the shaft on which it is mounted is subjected, and for every relative movement between the interface flange of the vessel and the shaft itself, guarantees the correct seal of the aperture of the vessel where the shaft is inserted, responding efficiently to the movements described above.

The Applicant has devised, tested and embodied the present invention to overcome the shortcomings of the state of the art and to obtain these and other purposes and advantages.

SUMMARY OF THE INVENTION

The present invention is set forth and characterized in the independent claim, while the dependent claims describe other characteristics of the invention or variants to the main inventive idea.

In accordance with the above purpose, a sealing device according to the present invention is suitable to be used in a vessel of fluids under pressure and/or granular material in movement, to achieve a fluid-tight seal in an aperture made in the lateral wall of the vessel, in which aperture a shaft is inserted, through and with play, for example having a transverse size comprised between 100 mm and 1200 mm.

The sealing device comprises first sealing means disposed in contact with the shaft in the zone of the aperture and suitable to follow possible axial and flexional movements of the shaft, while still allowing a possible rotation of the shaft with respect to them and to the lateral wall, and second sealing means disposed in the aperture and having a first part fixed to the lateral wall and a second part connected in sealed manner with the first sealing means, and suitable to allow reciprocal movements between the first sealing means and the lateral wall.

Therefore, the second sealing means are able to adapt to the possible axial and flexional movements of the first sealing means, which in turn follow the corresponding movements of the shaft, guaranteeing at the same time the total seal between the inside of the vessel, which can have inside it both high pressure and high temperature (for example about 800° C.-1000° C.), and the outside.

In this way, the different reciprocal movements of the shaft and the lateral wall of the vessel are separated and managed from the viewpoint of the fluid-tight seal by the first and second sealing means which define the device according to the present invention.

The advantage is therefore obtained that the shaft, with respect to the vessel, can both rotate and bend, if necessary, for example if the weight of the material present in the internal chamber of the vessel weighs upon it. In the same way, in applications where chemical reactions take place inside the vessel, and temperatures in the range of 800° C.-1000° C. are reached, it can dilate due to the heat effect. All this without compromising the fluid-tight seal of each of the apertures in which the shaft is inserted through, and without the sealing means suffering any damage due to the movements of the shaft with respect to the vessel.

In a preferred embodiment, the first sealing means comprise a containing element, which can be for example a tube, which defines a so-called cartridge and which is suitable to contain a plurality of sealing rings, disposed coaxial to and in contact with the shaft.

In this way the sealing rings are kept in a determinate axial position with respect to the shaft.

Furthermore, according to the present invention, the second sealing means comprise both a containing body, at least partly inserted in the aperture around the first sealing means, and also a flexible connection element, which is interposed between the containing body and the element containing the first sealing means.

Advantageously, the flexible connection element has a first end connected to the containing body and a second end, opposite the first end, connected to the containing element.

The flexible connection element advantageously allows to absorb the flexional movements of the first sealing means, which follow those of the shaft, and not to transmit them to the containing body.

According to the invention, a closing flange is provided and is connected both to an interface flange of the lateral wall of the vessel, and also to a flanged end of the containing body by means of attachment means. The closing flange is positioned in contact with the containing element and with the flexible connection element, so as to advantageously keep the first sealing means in a determinate axial position with respect to the shaft.

According to another characteristic of the invention, a frame is positioned outside and coaxially to the flanged end of the containing body and to the flanged end, and is suitable to constrain the movement of the containing body and the closing flange with respect to the vessel.

To confer greater safety on the seal of the sealing device, in a variant of the invention third sealing means are provided, associated with and in contact with the shaft, and cooperating with the first sealing means, to control the functioning of the first sealing means and possibly the fluid-tight seal on the shaft in case there is a malfunctioning of the first sealing means.

According to another characteristic of the present invention, the sealing device also comprises third sealing means, disposed in contact with the shaft and cooperating with the first sealing means.

The third sealing means have the function of controlling the functioning of the sealing rings and possibly a sealing function if there is any malfunctioning thereof.

In a preferred embodiment, the third sealing means comprise at least an annular cavity, made in an internal wall of a compression bushing provided in the first sealing means and suitable to hold the sealing rings axially compressed.

The annular cavity is delimited by the compression bushing and by said shaft, and is suitable to contain a fluid under pressure.

In a further preferred embodiment, the third sealing means comprise at least a sealing ring, disposed inside a seating made in the compression bushing and communicating with the annular cavity.

The sealing ring of the third sealing means, that is coaxial to the shaft and in contact with it, is compressed on said shaft by at least an inflatable gasket, disposed outside said sealing ring.

BRIEF DESCRIPTION OF THE DRAWINGS

These and other characteristics of the present invention will become apparent from the following description of a preferential form of embodiment, given as a non-restrictive example with reference to the attached drawings wherein:

FIG. 6 is a variant of FIG. 3;

FIG. 7 is a front view of a detail of FIG. 6;

FIG. 8 is a section from VII to VII of FIG. 7

FIG. 9 is a section view of a part of FIG. 6.

DETAILED DESCRIPTION OF A FORM OF EMBODIMENT

Figure 1:
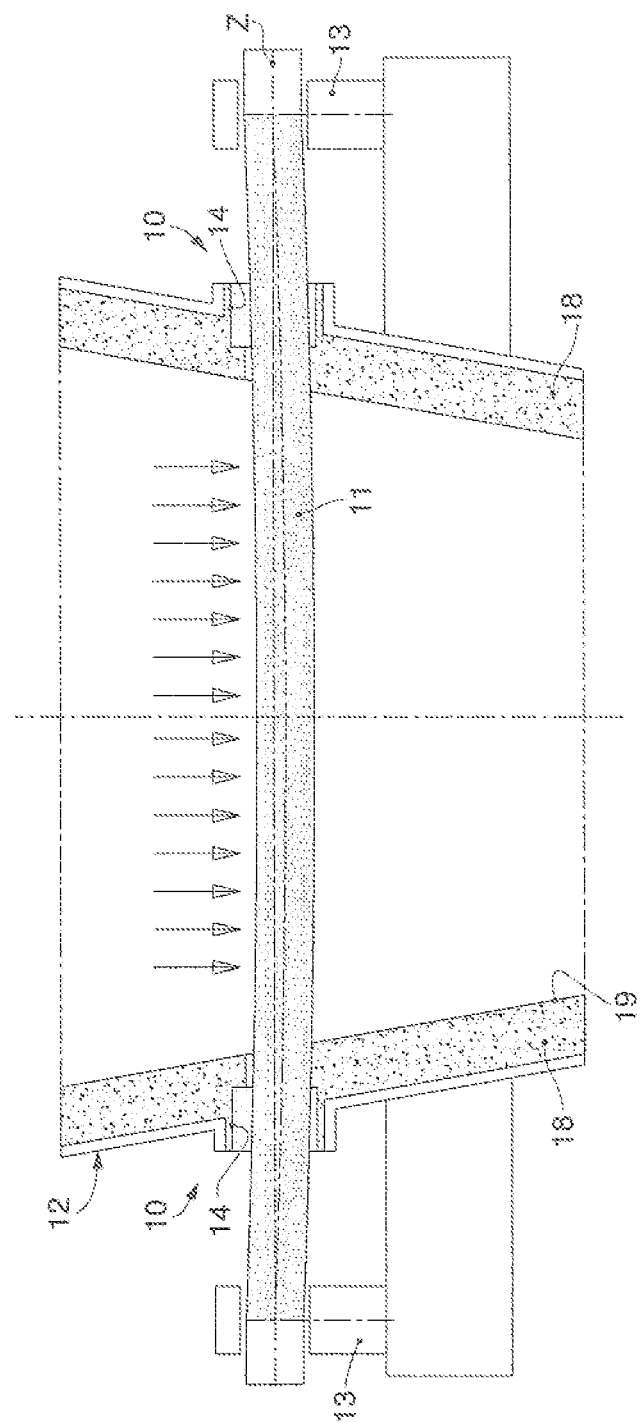
FIG. 1 shows schematically a vessel in which a pair of sealing devices according to the present invention is installed.

With reference to FIG. 1, a pair of sealing devices 10 is shown mounted on a vessel 12.

In particular, the two sealing devices 10 are suitable to obtain a fluid-tight seal in corresponding apertures 14 made on opposite sides in the lateral wall 18 of the vessel 12. A shaft 11 is inserted in the apertures 14, through and with play, the ends of which are supported by fixed supports 13, outside the vessel 12. The shaft 11, on which a distributed load of even several tens of tons may weigh, may also need to be rotated with respect to a longitudinal axis Z. Apart from the granular material weighing on the shaft, there may also be a pressurized fluid, also up to 8/9 bar, present in the vessel and very high temperatures can be reached, also 800° C.-1000° C.

Considering all these possible variables, each sealing device 10 must therefore be able to allow the shaft 11 both flexional and rotational movements while still guaranteeing the fluid-tight seal.

In the case in question (FIG. 2), each sealing device 10 is almost completely inserted inside a housing compartment 15, defined by a sleeve 16, exiting from the lateral wall 18 of the vessel 12 in correspondence with the aperture 14 and provided at one end with an interface flange 17.

The sealing device 10 comprises a plurality of annular shaped elements, all coaxial with respect to each other and to the shaft 11, and is attached to the vessel 12 by means of a flanged end 23 of a containing body 22, substantially cylindrical.

In the operating position, the cylindrical part of the containing body 22 is inserted in the housing seating 15, while the flanged end 23 is attached to the interface flange 17.

Inside the containing body 22 and in contact with the shaft 11 first sealing means are positioned, defined by a sealing unit 24 (FIGS. 2 and 3), comprising a plurality of sealing rings 25, for example six, separated into two groups by a spacer 26 and held in position by a first guide bushing 27, disposed in contact with the free side of the sealing ring 25 nearest the vessel 12, and by a second guide bushing 28, disposed in contact with the free side of the sealing ring 25 nearest the support 13.

A tube, also called cartridge 32, with a substantially cylindrical tubular shape, is positioned outside the sealing rings 25 and, at a first end, has an inner shoulder 33 suitable to couple with a corresponding shoulder 34 of the first guide bushing 27 and, at a second end, opposite the first end, a hollow 35 suitable to couple with a corresponding external shoulder 36 of a closing flange 37.

A compression bushing 38 cooperates with the second guide bushing 28, to thrust the latter axially toward the sealing rings 25 which, due to the compression and their own elasticity, and due to the effect of the coupling of the first guide bushing 27 and the cartridge 32, deform and guarantee the hermetic seal on the shaft 11.

The sealing rings 25 are such as to allow the shaft 11 to rotate around a longitudinal axis Z, without this motion being transferred either to the guide bushings 27, 28 or to the cartridge 32.

The embodiment as described above of the sealing unit 24 obliges the sealing rings 25 to remain constantly solid with the shaft 11, also keeping them always in position, that is, coaxial with the shaft 11, even when the latter bends along the longitudinal axis Z during functioning.

Figure 2:
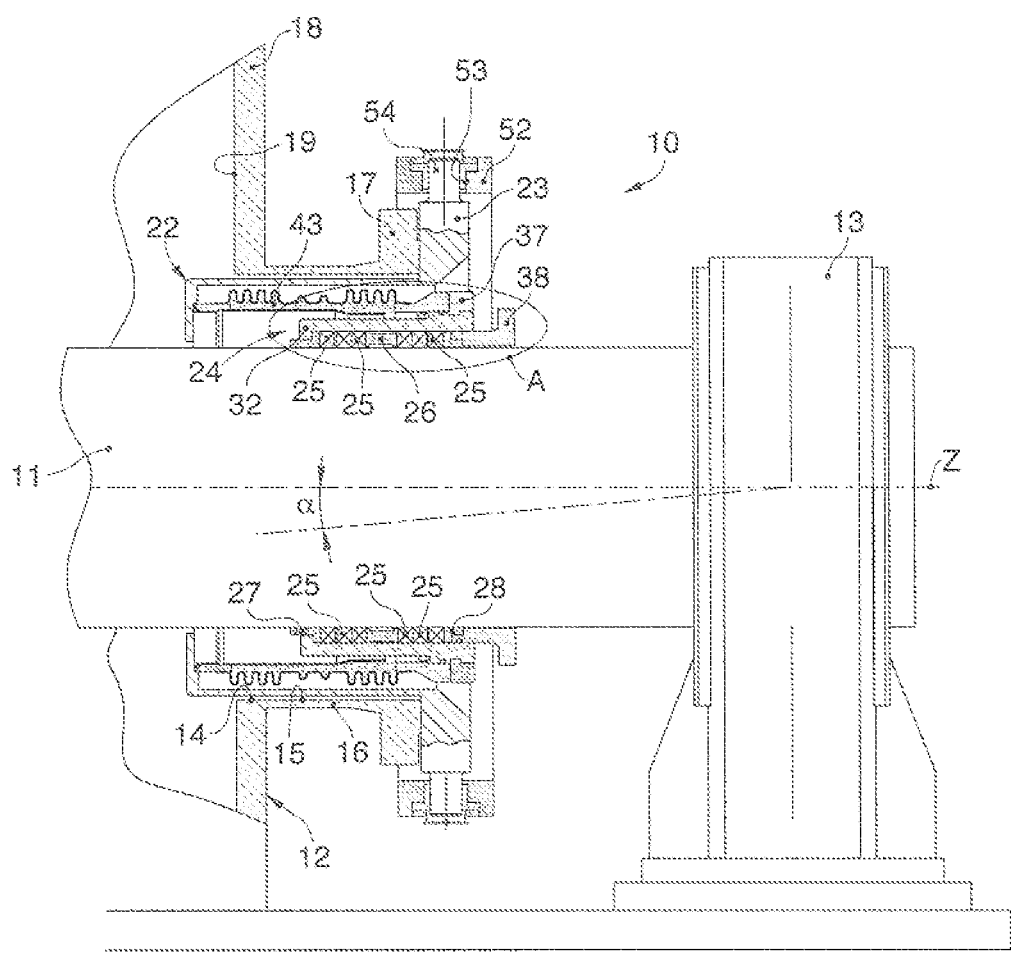
FIG. 2 is a lateral view, partly in section, of one of the sealing devices in FIG. 1.
Figure 3:
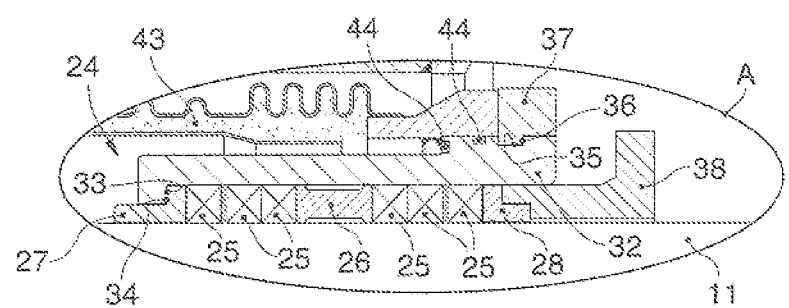
FIG. 3 is an enlarged view of the detail A in FIG. 2.

The flexion is indicated in FIG. 2 by the angle α, which can have an amplitude of about 1°.

An elastic connection element 43 is positioned inside the containing body 22 and outside the cartridge 32, it has one end connected to the containing body 22 and the opposite end connected to the cartridge 32, and is held axially in position by the closing flange 37. Since the elastic connection element 43 is constrained at its ends and is deformable in its central part, it functions as a flexible joint between the sealing unit 24 and the containing body 22.

In this way, the flexion of the shaft 11 and consequently of the sealing unit 24 is not transmitted to the containing body 22, since the elastic connection body 43 is able to bend at one end only, that is, the one connected to the cartridge 32, keeping the one connected to the containing body 22 fixed. Consequently, even if the shaft 11 bends, the sealing unit 24 remains in its own position with respect to the shaft 11, and at the same time the containing body 22 remains in its own position with respect to the interface flange 17 of the vessel 12.

Both the coupling of the elastic connection element 43 and the containing body 22, which in the case in question is for example achieved through welding, and also the coupling of the elastic connection element 43 and the cartridge 32, which uses two gaskets 44, are fluid-tight, so that the elastic connection element 43 and the containing body 22 function as second sealing means against the leakage of gas from the aperture 14 of the vessel 12.

The closing flange 37 (FIG. 4) consists of two semi-disks, in this case an upper semi-disk 45 and a lower semi-disk 46, both elongated in shape in a transverse direction, symmetrical with respect to the shaft 11 and coupled with each other in correspondence with the center line. Attachment means are provided to connect the closing flange 37 to the interface flange 17 and to the flanged end 23, as described hereafter in detail. In this case, two upper tie-rods 47 (FIGS. 4 and 5) connect the upper semi-disk 45 to the interface flange 17 and to the flanged end 23 of the containing body 22, whereas two lower tie-rods 48, connect, with play, the lower semi-disk 46 to the interface flange 17 and to the flanged end 23 of the containing body 22.

Figure 4:
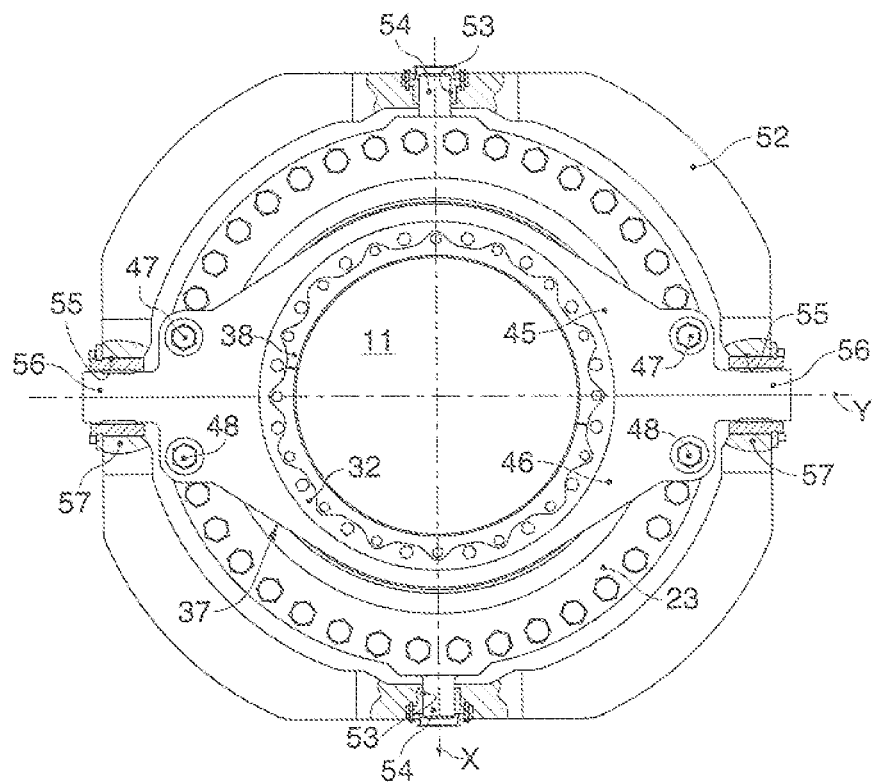
FIG. 4 is a front view of the device in FIG. 2.
Figure 5:
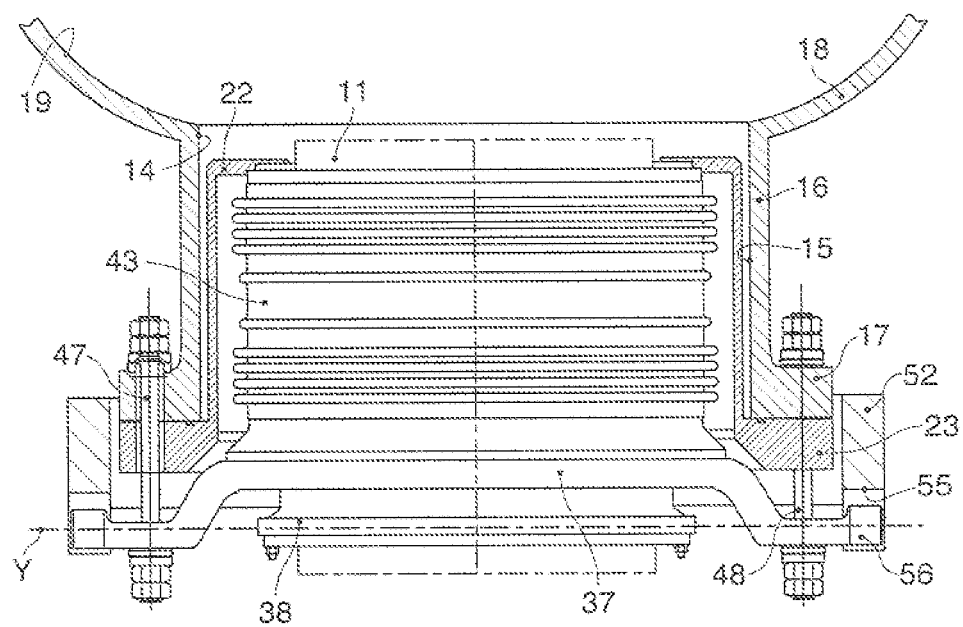
FIG. 5 is a plan view, partly in section, of the device in FIG. 2.

A frame 52, for example with a discoid or toroid shape, is positioned outside to the flanged end 23 of the containing body 22 and the interface flange 17, and is coaxial to both. With reference to FIG. 4, two first cavities 53 are made vertically in the frame 52 on opposite sides with respect to the shaft 11 and are aligned with each other, defining a first transverse axis X, orthogonal to the longitudinal axis Z of the shaft 11. The first cavities 53 are suitable to contain, with play along the first transverse axis X, two pins 54, integrated externally in the flanged end 23.

Two second cavities 55 are made horizontally in the frame 52 on opposite sides with respect to the shaft 11 and are aligned with respect to each other to define a second transverse axis Y, orthogonal both to the first transverse axis X and also to the longitudinal axis Z of the shaft 11. The second cavities 55 are each suitable to contain a pivoting element 56, obtained by joining two protruding portions disposed at the transverse end of the upper semi-disk 45 and the lower semi-disk 46.

A bearing 57 functions as a support element to support each pivoting element 56 so that, also thanks to the coupling with play, described above, of the lower tie-rods 48 and the lower semi-disk 46, the closing flange 37 can rotate, although only by a few degrees, around the second transverse axis Y, so as to follow the flexion of the shaft 11 during the process, and allow the sealing unit 24 to remain coaxial to the shaft 11.

The heat dilation of the vessel 12 can cause a movement of the interface flange 17, and consequently of the sealing device 10, along the first transverse axis X and/or along the second transverse axis Y. The relative movement of the closing flange 37, with which the sealing unit 24 is solid, with respect to the interface flange 17 and the flanged end 23 of the containing body 22, solid with the lateral wall 18 of the vessel 12, is allowed by the coupling of the pins 54 and the first cavities 53 of the frame 52, which function as constraint elements along the axis X, and by the coupling of the pivoting elements 56 and the first cavities 55 of the frame 52, which function as constraint elements along the axis Y. To allow these movements, the tie-rods 47 and 48 are equipped with spherical terminals and are located in respective holes with a bigger diameter than that of the tie-rods 47 and 48, thus allowing the inclination thereof.

The movement of the sealing device 10 along the longitudinal axis Z of the shaft 11, due to the force of the pressure inside the vessel 12 and which would entail an elongation and a consequent breakage of the elastic connection element 43, is clamped by the tie-rods 47 and 48.

In this way, the resultant movement of the closing flange 37 with respect to the interface flange 17 consists of a flat motion lying on the plane defined by the first transverse axis X and the second transverse axis Y and of a rotation around the second transverse axis Y.

To facilitate the maintenance of the sealing device 10, in one form of embodiment of the invention, the frame 52 may be made in two or more parts, connected to each other in correspondence with the second cavities 55.

In a variant of the sealing device 10 of the invention (FIG. 6), third sealing means 60 are provided, which have the function of controlling the functioning of the sealing rings 25 and possibly a sealing function if there is any malfunctioning thereof.

The third sealing means 60 comprise an annular cavity 61, made in the internal wall of the compression bushing 38 and delimited by the latter and by the shaft 11, into which a fluid is blown, for example an inert gas, at a greater pressure than that of the gases present in the internal chamber 19 of the vessel 12, to act as a pneumatic barrier against any leakage thereof. Measuring means 63 are provided inside the annular cavity 61 to monitor the flow of fluid contained therein and consequently to allow to identify possible leakages and malfunctions of the sealing unit 24 or the third sealing means 60.

In the rear part of the compression bushing 38 there is also a seating 62, communicating with the annular cavity 61 and suitable to contain one or more sealing rings 64, in contact with the shaft 11, and closed on the latter by the force exerted by an inflatable gasket 65, disposed outside the sealing rings 64.

A cover 66, attached to the compression bushing 38, closes the seating 62 at the back and allows the hermetic closure of the annular cavity 61 as well.

FIG. 9 shows both a transverse cross-section and a circumferential cross-section of the inflatable gasket 65 having an open-ring construction type, the circumferential cross-section being limited to a portion of the inflatable gasket 65 near to its two ends 65a.

The open-ring construction type allows the inflatable gasket 65 to be easily replaced during operation, for example in case of a pressure loss thereof, merely disassembling the cover 66 without removing any other element, such as the support 13 or other members, the removal of which should imply a plant stop.

In the embodiment disclosed, the ends 65a of the inflatable gasket 65 are configured in order to provide a pressure distribution which is uniform on the whole circumference of the sealing rings 64. In this case, the ends 65a are made thicker in the inner side of the sealing gasket 65, so as to keep the pressure on the sealing rings 64 adequate.

The sealing rings 64 (FIGS. 7 and 8) are each equipped with a self-sealing joint comprising a pair of platelets 67 housed inside a pair of grooves 68 made laterally on opposite sides of each sealing ring 64, and three elastomer blocks 69, which seal the joint on the circumference.

It is clear that modifications and/or additions of parts may be made to the sealing device 10 as described heretofore, without departing from the field and scope of the present invention.

It is also clear that, although the present invention has been described with reference to some specific examples, a person of skill in the art shall certainly be able to achieve many other equivalent forms of sealing device 10, having the characteristics as set forth in the claims and hence all coming within the field of protection defined thereby.

The invention claimed is:

1. A sealing device for a vessel suitable to contain fluids under pressure and/or granular material in movement, to achieve a fluid-tight seal in an aperture made in the lateral wall of said vessel, into which aperture a shaft is inserted in a through manner and with play, said sealing device comprising:

first sealing means disposed in contact with said shaft in the zone of said aperture and configured to follow possible axial and flexional movements of said shaft, while still allowing a possible rotation of said shaft with respect to them and to said lateral wall, said lateral wall comprising an interface flange;

second sealing means, comprising at least a containing body fixedly attached to said interface flange and a flexible connection element disposed in said aperture with a first part fixed to said containing body and a second part connected in sealed manner with said first sealing means to allow reciprocal movements of said first sealing means and said containing body, wherein said first sealing means comprise a plurality of sealing rings, disposed coaxial to said shaft and in contact with the latter, and a containing tube to contain said sealing rings and to constrain said sealing rings in a determinate axial position with respect to said shaft, wherein a closing flange is connected to said interface flange and to a flanged end of said containing body by means of attachment means and is positioned in contact with said containing tube and with said flexible connection element to keep said first sealing means in a determinate axial position with respect to said shaft, and wherein said sealing device also comprises a frame, positioned outside and coaxially to said flanged end of said containing body, and first constraint elements being associated to said frame and to said flanged end to allow the movement of said containing tube with respect to said vessel along a first transverse axis, orthogonal to the longitudinal axis of said shaft;

second constraint elements are associated to said frame and to said closing flange to allow movement of said containing tube with respect to said vessel along a second transverse axis, orthogonal to said first transverse axis and to said longitudinal axis of said shaft.

2. The device as in claim 1, wherein said containing body is at least partly inserted in said aperture and is suitable to contain said first sealing means, and said flexible connection element is interposed between said first sealing means and said containing body and suitable to connect said first sealing means to said containing body.

3. The device as in claim 1, wherein said flexible connection element has a first end connected to said containing body and a second end, opposite said first end, connected to said containing tube.

4. The device as in claim 1, wherein said closing flange comprises at least two pivoting elements, positioned on opposite sides and aligned along said second transverse axis and suitable to pivot in second cavities of said frame, support elements being provided in said second cavities to support said pivoting elements and allow said closing flange to oscillate around said second transverse axis.

5. The device as in claim 1, wherein it also comprises third sealing means, disposed in contact with said shaft and cooperating with said first sealing means.

6. The device as in claim 1, wherein said first sealing means comprise a compression bushing at least partly contained inside said containing element and suitable to hold said sealing rings axially compressed.

7. The device as in claim 5, wherein said third sealing means comprise at least an annular cavity, made in an internal wall of said compression bushing and delimited by the latter and by said shaft, said annular cavity being suitable to contain a fluid under pressure.

8. The device as in claim 7, wherein said third sealing means comprise at least a sealing ring, disposed inside a seating made in said compression bushing and communicating with said annular cavity, coaxial to said shaft and in contact with it, said at least one sealing ring being compressed on said shaft by at least an inflatable gasket, disposed outside said sealing ring.

9. A sealing device for a vessel suitable to contain fluids at temperatures above 800° C. under pressure and/or granular material in movement, to achieve a fluid-tight seal in an aperture made in the lateral wall of said vessel, into which aperture a shaft is inserted in a through manner and with play, said sealing device comprising:

a first seal disposed in contact with said shaft in the zone of said aperture and configured to follow possible axial and flexional movements of said shaft, while still allowing a possible rotation of said shaft with respect to them and to said lateral wall, a second seal, comprising at least a containing body and a flexible connection element and disposed in said aperture with a first part fixed to said lateral wall and a second part connected in sealed manner through the flexible connection element with said first seal to allow reciprocal movements of said first seal and said lateral wall, wherein said first seal comprises a plurality of sealing rings, disposed coaxial to said shaft and in contact with the latter, and a containing tube to contain said sealing rings and to constrain said sealing rings in a determinate axial position with respect to said shaft, wherein said lateral wall of said vessel comprises an interface flange, wherein a closing flange is connected to said interface flange and to a flanged end of said containing body and is positioned in contact with said containing tube and with said flexible connection element to keep said first seal in a determinate axial position with respect to said shaft, and wherein said sealing device also comprises a frame, positioned outside and coaxially to said flanged end of said containing body, first constraint elements being associated to said frame and to said flanged end to allow the movement of said containing body with respect to said vessel along a first transverse axis, orthogonal to the longitudinal axis of said shaft;

second constraint elements are associated to said frame and to said closing flange to allow the movement of said containing tube with respect to said vessel along a second transverse axis, orthogonal both to said first transverse axis and to said longitudinal axis of said shaft, wherein said first constraint elements comprise at least a first cavity, made in said frame and suitable to contain, with play, a pin integrated in said flanged end of said containing body.

10. The device as in claim 1, wherein said first constraint elements comprise at least a first cavity, made in said frame and suitable to contain, with play, a pin integrated in said flanged end of said containing body.

\* \* \* \* \*